Figure 1:
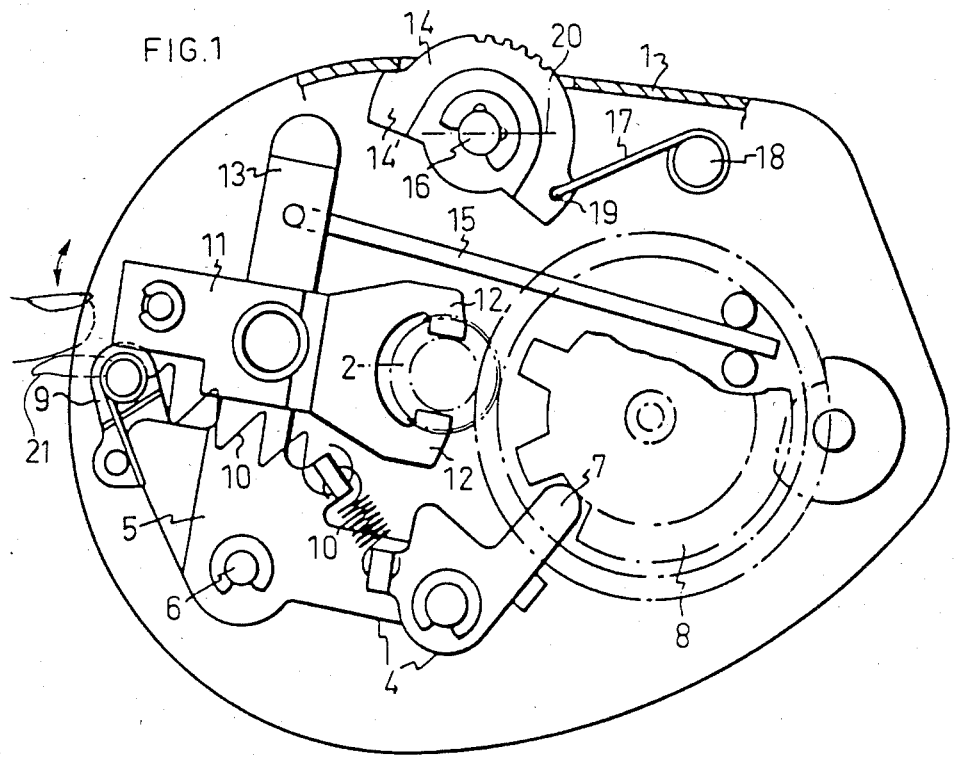

United States Patent [19]

Moosberg et al.

[11] Patent Number: 4,564,158

[45] Date of Patent: Jan. 14, 1986

[54] FISHING REEL CLUTCH RELEASE MECHANISM

[75] Inventors: Börje S. Moosberg; Jarding U. Karlsson, both of Mörrum, Sweden

[73] Assignee: Abu Aktiebolag, Svangsta, Sweden

[21] Appl. No.: 545,428

[22] Filed: Oct. 26, 1983

[30] Foreign Application Priority Data

Nov. 9, 1982 [SE] Sweden ............................... 8206342

[51] Int. Cl.[4] ............................................ A01K 89/00
[52] U.S. Cl. ..................................... 242/220; 242/212
[58] Field of Search ............... 242/217, 218, 219, 211, 242/212, 213, 214, 220; 192/67 R

[56] References Cited

U.S. PATENT DOCUMENTS

| | | | |
|---|---|---|---|
| 1,939,148 | 12/1933 | Spenny | 242/220 |
| 2,002,424 | 5/1935 | Weaver | 242/211 |
| 4,014,422 | 3/1977 | Morishita | 192/67 R |
| 4,281,808 | 8/1981 | Noda | 242/218 |
| 4,341,366 | 7/1982 | Kawada | 242/220 |
| 4,379,530 | 4/1983 | Kobayashi | 192/67 R X |

Primary Examiner—Donald Watkins
Assistant Examiner—Katherine Jaekel

Attorney, Agent, or Firm—Sheridan Neimark; Karl W. Flocks

[57] ABSTRACT

The invention relates to a fishing reel having a rotatable line spool, a hand crank and a transmission connected with the line spool through a disengageable clutch, and comprising a clutch engaging and disengaging device, a hand operated actuating member for disengaging, means for disengageably locking said device in the disengaged position, and spring biased returning means for reengaging said clutch in said device; the improvement being characterized by a blocking device comprising a first member which is movable with a movable part of said engaging and disengaging device, and a manually operable second member which is pivotable manually between two positions and is arranged such that, in one position, it permits unhindered disengaging operation of the clutch engaging and disengaging device and also of the locking operation of the locking device, and, in the other position, restricts the freedom of motion for said disengaging operation in a position in which said locking operation of the locking device is prevented, whereby returning of said blocking device permits spring operated returning of the engaging and disengaging device into the engaged position without any unlocking operation of said locking device.

12 Claims, 2 Drawing Figures

U.S. Patent Jan. 14, 1986 4,564,158

FISHING REEL CLUTCH RELEASE MECHANISM

The present invention relates to a fishing reel of the type comprising a rotatable line spool, a transmission means, a disengageable clutch for connecting the transmission means with the line spool, a hand crank for rotating the line spool via the transmission means and a clutch engaging and disengaging device comprising a disengaging mechanism and an actuating member by means of which said disengaging mechanism and said clutch are actuatable for disengaging the line spool from said transmission means, and cooperable and disengageable locking members which by means of said disengaging mechanism, when being operated by said actuating member for disengaging said clutch in a final phase of this operation after a disengagement of said clutch already is effected, are operable and brought into engagement with one another to lock said disengaging mechanism in its disengagement position, and an engaging mechanism including spring means for releasing said locking members from said engagement and returning said disengaging mechanism and said clutch into engaging position for said line spool.

In fishing reels of the multiplier type, the line spool is disengaged, i.e. made free-running, before a cast is made and the line spool is held stationary by hand during the initial phase of the cast; the line spool is released the instant the angler desires the bait and the line to run out. In several fishing reels of the type here intended, the hand operated actuating member for the clutch disengaging mechanism is in the form of an operating key positioned behind the line spool. When the line spool is disengaged, the disengaging mechanism is retained in disengagement position against the action of a return spring by means of a locking mechanism of which there are many known constructions and which are releasable by means of the hand crank. To release the return movement of the disengagement mechanism, the crank must be rotated through part of a revolution. Such releasing of the locking mechanism initiates reengaging movement of the clutch engaging and disengaging device into the state in which the clutch is engaged and the line spool is rotatable by means of the hand crank. As is well known, the line can now no longer run out freely. In this state, however, the line spool is still rotatable, but only against the action of an adjustable sliding brake.

In this known construction, the angler is unable to reengage the line spool without moving the hand, usually the right hand, gripping the fishing rod to the crank for rotating the latter. In view hereof, the angler must shift his grip on the rod from the right to the left hand. When he wishes to stop line run-out at the end of a cast, he usually presses the thumb of the right hand, that is the hand which grips the rod. For a new cast, he must again shift the rod from his right to his left hand and use his free right hand to operate the crank to an extent sufficient to release the return of the disengagement mechanism into engagement position. Thus, the usual technique is to remove the thumb from the line spool and to shift the rod from one hand to the other and then to operate the crank with the hand whose thumb shortly before was holding the line spool. While the angler is shifting his grip, it may happen that the line runs out freely, resulting in line entanglement.

The present invention aims at obviating these shortcomings by providing the fishing reel with a device, by means of which the line spool is reengageable in a quicker and easier manner. A further object of the invention is to provide the fishing reel with a device for this purpose which easily can be rendered inoperative at any time so that the angler, if he so wishes, can use the fishing reel in the traditional way.

To this end, the fishing reel according to the invention comprises, for cooperation with the clutch engaging and disengaging device, a first member movable together with a part of the disengaging mechanism and a second member manually movable between a free position and a blocking position, said second member being adapted to permit, in said free position thereof, conventional use of the disengaging mechanism and having means extending, in the blocking position of said second member, into the path of motion of said first member at such a position of said path to establish sufficient freedom of motion for said disengaging mechanism to permit resetting thereof from the engaging position to the disengaging position, but insufficient freedom of motion to permit the final phase motion of said disengaging mechanism, thereby preventing the locking members from engaging with one another to lock the disengaging mechanism in the disengagement position, the spring means thus being permitted to return the disengaging mechanism from its disengagement position to the engagement position thereof as soon as the actuating member is released.

Further features and advantages of the invention will appear from the following, where the invention will be described in greater detail with reference to the accompanying drawing in which FIG. 1 shows in plan view an inner part of a fishing reel, said part comprising a supporting plate having mounted thereon an engaging and disengaging assembly as well as a blocking device according to the invention, said assembly being shown in the disengaged and locked position and said blocking device being shown in the inoperative position.

Figure 2:
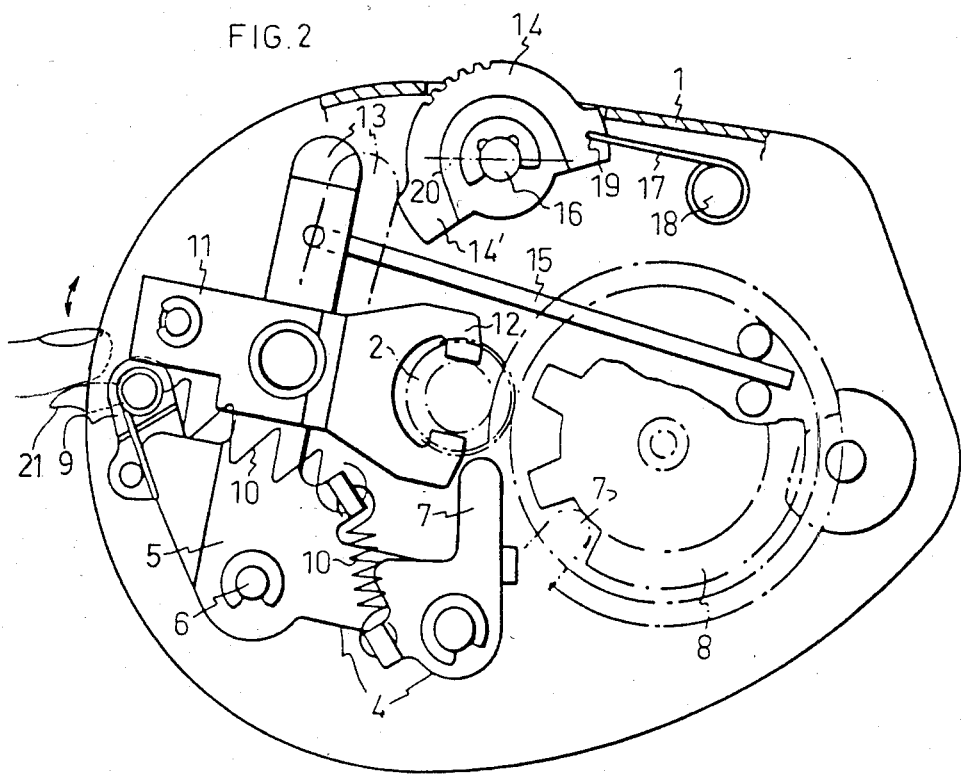

FIG. 2 is a similar view showing the disengaging mechanism in disengaged but not locked position and the blocking device in blocking position.

In the drawing, a plate 1 forms an inner part of the frame of a known multiplier type fishing reel. The plate supports a known clutch engaging and disengaging device for a clutch 2 which in engaged position connects the line spool of the fishing reel and a transmission (not shown) driven by a hand crank (not shown). The clutch engaging and disengaging device comprises a disengaging mechanism which in turn comprises a lever system 4 including a main lever 5 which is pivotal on a shaft 6, and a second lever 7 which is supported by and linked to the main lever 5 and forms a locking arm for engaging a ratchet 8. The main lever 5 is operable by means of a known actuating member, typically in the form of an operating key 21, which acts on a clutch member disengaging part 9 and by which the main lever 5 can be pivoted against the action of a spring assembly 10 to a position in which said clutch is disengaged from the line spool and the locking arm 7 engages the ratchet 8 and is locked by the latter, thereby retaining the disengaging mechanism in the disengaged position for the clutch. By the pivoting motion of the lever assembly described above, the line spool is disengaged from the transmission in that the main lever 5 lifts a fork 11 which by means of a pair of fork arms 12 lifts the clutch member 2 upwards out of the plane of the drawing, thereby disengaging the line spool from the crank driven transmission. In the position shown by full lines in FIG. 2, the line spool is coupled with the crank (not shown) of the fishing reel to a gear transmission by means of said clutch, a part of which is designated 2.

To return the disengaging mechanism from the disengagement position in FIG. 1 to the engagement position in FIG. 2 (full lines) the crank must be turned such that the ratchet wheel 8 pivots the locking arm 7 to a disengaged position, whereupon the spring assembly 10 pivots the main lever 5 counter-clockwise with respect to FIG. 1. Thus, it is the ratchet wheel 8 that actuates the locking arm 7 by rotating it against the action of the lower spring 10 which is then tensioned. Also, a compression spring could be used as lower spring 10.

According to the invention, the main lever 5 has a protruding arm 13 which forms a first member of a blocking device and is adapted to cooperate with a second locking member 14. This blocking device according to the invention will be described in greater detail below. First it should be mentioned, however, that the arm 13 in the embodiment illustrated also serves to actuate an operating rod 15 in a known device for disengaging a line control mechanism (not shown) of the type disclosed in the published Swedish patent application No. 8002090-2 to which reference is made for detailed information about the engaging and disengaging device.

In the embodiment illustrated, the second blocking member 14 of the blocking device according to the invention comprises a disc which is rotatable on a journal 16 from and to two stable positions on either side of an unstable intermediate position. To this end, the disc 14 is bistably biased by means of a spring 17 acting between a spring attachment 18 connected to the plate 1, and a point 19 on the disc 14.

FIG. 1 shows the disc 14 in the inoperative position in which the fishing reel can be used in conventional manner. This position is the inoperative position of the disc 14. FIG. 2 shows the disc 14 in blocking position. A fluted portion of the disc 14 extends beyond periphery of the plate 2 to a position in which it is easily accessible from the upper side of the fishing reel to be operated by means of a finger, for instance the thumb of the hand grasping the fishing rod. The spring 17 operates in such a manner that it tends to retain the disc 14 in either of the two stable position shown in FIGS. 1 and 2 in that the point of action of the spring 17 on the disc 14 passes an unstable centre in relation to the spring during its passage in opposite directions past the horizontal dash-dot line 20.

In the fishing reel according to the invention, the clutch connecting the line spool with the transmission is disengageable and reengageable in normal manner, i.e. in the same manner as in known fishing reels comprising an engaging and disengaging mechanism of known type, but the blocking device according to the invention makes it possible to use the conventional mechanism in a novel manner whenever this is desired. After setting the disc 14 to the blocking position shown in FIG. 2, the line spool can be disengaged without causing the locking arm 7 and the ratchet 8 to enter into mutual engagement to lock the mechanism in the disengaged and locked position shown in FIG. 1. In the embodiment illustrated, this is prevented in that the extension 13 of the main lever 5 is stopped in the position shown by dash-dot lines in FIG. 2, when the clutch engaging and disengaging device is operated for disengaging the clutch, by abutment against a nose portion 14' of the disc 14. When the extension 13 is stopped in this position, the line spool has been disengaged, but the locking arm 7 has as yet not assumed such a position that it has reached and been intercepted between a pair of teeth of the ratchet 8, as in the position shown by dash-dot lines in FIG. 2. Accordingly, the disengaging mechanism is free to be returned to the engagement position for the line spool as soon as the thumb operated actuating member 9 for the disengaging mechanism is released.

The device according to the invention is extremely useful when the angler, after completion of a cast, wishes to stop the line spool quickly and efficiently with a minimum of exertion.

To operate the disengagement mechanism, use is preferably made of an actuating member in the form of a key readily accessible to the thumb of the "casting hand" behind the line spool. After the disc 8 has been set to the position shown in FIG. 2, the line spool can be disengaged for free running without causing the mechanism to be locked in the disengagement position, by depressing the actuating key. The angler can easily do this by putting the tip of his thumb on the spool, while at the same time with the base of this thumb holding down the key to hold the disengaged line spool. The line spool is disengaged as long as the operating key is depressed, and when the bait reaches the water, or at any other suitable moment, the angler can stop the line spool simply by releasing the actuating key. Thus, he need not operate the crank in order to release a spring operated return movement of the engaging and disengaging device, into the engagement position for the line spool.

The blocking device 13, 14, 17 according to the invention can be used with all types of fishing reels equipped with a clutch engaging and disengaging device that can be locked in the disengagement position by means of a locking device 7, 8, which is releasable by means of the crank for initiating a reengaging movement of the spring biased clutch engaging and disengaging device, the disengaging mechanism of which need not necessarily be the above-mentioned actuating key. It is evident to those skilled in the art that the blocking device according to the invention may comprise two cooperating members of a construction different from that of the members 13 and 14. What is important is that one of the blocking members is movable with the movement of the disengagement mechanism, and that the other blocking member 14 is accessible from the outside of the fishing reel to be switched between its operative and inoperative positions and, in the operative position, will block the first-mentioned member 13 in a position in which the disengaging mechanism, although disengaged, has not yet reached a final or end position in which the mechanism is locked in the disengagement position for the locking means 7, 8.

It is pointed out that the embodiment of the actual clutch operating device as described above and illustrated in the drawing has been selected merely in order to exemplify the invention which is applicable to all clutch operating devices which are arranged or can be modified without difficulty in such a manner that they, in the final phase of the disengaging operation, are locked or retained and thereby held in disengaged position and then automatically returned to engaged position when the locking or retention has been eliminated by rotating the crank, or in some other manner.

We claim:

1. A fishing reel, comprising:

a rotatable line spool;

a transmission means for rotating the line spool;

a disengageable clutch member (12) for engaging the transmission means with the line spool;

a disengaging mechanism movable between an engaging and a disengaging position corresponding to an engaging and a disengaging position of said clutch member, said disengaging mechanism having a lever (5) attached thereto, said lever having a protruding arm forming a first member (13) movable together with said lever (5) of the disengaging mechanism between a engaged and said disengaging position corresponding to the engaging and disengaging position of said clutch disengaging mechanism, respectively, thereby defining a path;

a clutch member disengaging means (9) adjacent said lever for acting upon said lever to disengage said clutch member (12) from the line spool thus disengaging the line spool from said transmission means;

cooperable and disengageable locking members (7, 8), at least one of which is attached to said lever (5), for engaging with one another to lock said disengaging mechanism in its disengaging position;

an engaging mechanism including:

spring means (10) for releasing said locking members from said engagement with one another and returning said disengaging mechanism and said clutch member into engaging position with said line spool, wherein said fishing reel further comprises:

a second member (14), manually movable between a free position and a blocking position, said second member for encroaching upon said path to block the motion of said first member (13) between said engaged and disengaged position of said first member (13) at such a position along said path so as to provide sufficient freedom of motion for said disengaging mechanism to permit the movement of said disengaging mechanism, and thereby said clutch member, from the engaging position to the disengaging position, but insufficient freedom of motion to permit locking members (7, 8) from engaging with one another to lock said disengaging mechanism, and thereby said clutch member, in said disengaging position, said spring means (10) returning said disengaging mechanism from its disengaging position to the engaging position thereof as soon as said activating means (9) is released;

and means, comprising said second member and said activating means, for automatically effecting the reengagement of said clutch member, when said second member is in the blocking position, upon release of said actuating means.

2. A fishing reel as claimed in claim 1, wherein the said first member (13) comprises first abutment means movable together with said lever, said second member being mounted pivotably by means of a pivot (16) and supporting a second abutment means (14') which, by manual pivoting of said second member through part of a revolution, enters said path of movement of said first movable abutment means (13).

3. A fishing reel as claimed in claim 1, wherein said second member (14) is biased by spring means (17) having two biasing positions and an unstable position therebetween, said spring means, after passing through said unstable position, tending to hold said second member (14) in either one of its two biasing positions.

4. A fishing reel as claimed in claim 1, having an inner side and an exposed outer side and wherein the fishing reel comprises a wall defining an opening therethrough and said second member (14) is mounted in a position in which said second member extends from inside said wall through said opening to the outer side of said wall.

5. A fishing reel as claimed in claim 1, wherein said clutch disengaging member 9 is in the form of an operating key located behind the line spool in a conveniently accessible position for depression of said key by the thumb of the hand holding the fishing rod during casting, and means comprising said key and said second member, for, when said second member is in its blocking position, reengaging said clutch automatically upon release of said operating key.

6. A fishing reel as claimed in claim 2, wherein said member (14) is biased by spring means having two biasing positions and an unstable position therebetween, said spring means, after passing through said unstable position, tending to hold said second member (14) in either one of its two biasing positions.

7. A fishing reel as claimed in claim 2, having an inner side and an exposed outer side and wherein the fishing reel comprises a wall defining an opening therethrough and said second member (14) is mounted in a position in which said second member extends from inside said wall through said opening to the outer side of said wall.

8. A fishing reel as claimed in claim 3, having an inner side and an exposed outer side and wherein the fishing reel comprises a wall defining an opening therethrough and said second member (14) is mounted in a position in which said second member extends from inside said wall through said opening to the outer side of said wall.

9. A fishing reel as claimed in claim 6, having an inner side and an exposed outer side and wherein the fishing reel comprises a wall defining an opening therethrough and said second member (14) is mounted in a position in which said second member extends from inside said wall through said opening to the outer side of said wall.

10. A fishing reel as claimed in claim 2, wherein said clutch disengaging means member (9) is in the form of an operating key located behind the line spool in a conveniently accessible position for depression of said key by the thumb of the hand holding the fishing rod during casting, and means comprising said key and said second member for, when said second member (14) is in its blocking position, reengaging said clutch automatically upon release of said operating key.

11. A fishing reel as claimed in claim 3, wherein said clutch disengaging means member (9) is in the form of an operating key located behind the line spool in a conveniently accessible position for depression of said key by the thumb of the hand holding the fishing rod during casting, and means comprising said key and said second member for, when said second member (14) is in its blocking position, reengagement of said clutch automatically upon release of said operating key.

12. A fishing reel as claimed in claim 4, wherein said clutch disengaging means member (9) is in the form of an operating key located behind the line spool in a conveniently accessible position for depression of said key by the thumb of the hand holding the fishing rod during casting, and means comprising said key and said second member, for, when said second member (14) is in its blocking position, reengagement of said clutch automatically upon release of said operating key.

* * * * *